United States Patent [19]

Covaleski

[11] 4,320,823

[45] Mar. 23, 1982

[54] FRICTION MEMBERS FORMED FROM COMPOSITIONS CONTAINING ARAMID FIBERS AND AN AQUEOUS HEAT-HARDENABLE CEMENT COMPRISING A WATER SOLUBLE PHENOLIC RESIN AND A HEAT-CURABLE ELASTOMER

[75] Inventor: Stanley F. Covaleski, Milford, Conn.

[73] Assignee: Raybestos-Manhattan, Inc., Stratford, Conn.

[21] Appl. No.: 50,598

[22] Filed: Jun. 21, 1979

[51] Int. Cl.³ .................... B32B 25/02; B32B 27/04; B32B 27/34; B32B 27/42; F16D 69/02

[52] U.S. Cl. ............................ 192/107 M; 156/171; 156/172; 156/177; 156/180; 188/251 A; 428/65; 428/107; 428/241; 428/242; 428/243; 428/323; 428/326; 428/328; 428/331; 428/409; 428/902; 525/133; 525/141; 525/179

[58] Field of Search .............. 428/65, 902, 409, 107, 428/323, 326, 328, 331, 241, 242, 243; 192/107 M; 156/172, 175, 180, 171, 176, 177; 188/251 A; 260/38, 17.2; 525/133, 141, 179

[56] References Cited

U.S. PATENT DOCUMENTS

| | | |
|---|---|---|
| 3,094,511 | 6/1963 | Hill et al. . |
| 3,556,922 | 1/1971 | Green et al. . |
| 3,743,069 | 7/1973 | Barnett et al. ...................... 156/173 |
| 3,756,910 | 9/1973 | Peters et al. .......................... 428/222 |
| 4,118,528 | 10/1978 | Lowry ................................... 428/65 |
| 4,130,537 | 12/1978 | Bohrer ................................. 428/273 |

FOREIGN PATENT DOCUMENTS 2708488 2/1977 France .
2000517 1/1979 United Kingdom .

Primary Examiner—James C. Cannon
Attorney, Agent, or Firm—Howson and Howson

[57] ABSTRACT

A friction member of improved resistance to wear comprising aramid fibers impregnated with and bonded together by means of a heat-curable cement containing a vulcanizable, rubber which may be carboxylated, a water-soluble, one-step phenolic-type resin and friction modifiers.

34 Claims, 4 Drawing Figures

FRICTION MEMBERS FORMED FROM COMPOSITIONS CONTAINING ARAMID FIBERS AND AN AQUEOUS HEAT-HARDENABLE CEMENT COMPRISING A WATER SOLUBLE PHENOLIC RESIN AND A HEAT-CURABLE ELASTOMER

The present invention relates to friction members, such as clutch facings and disc brake pads, comprising aramid fibers, bonded together with an aqueous base heat-hardenable cement, and to a method for making such members.

BACKGROUND OF THE INVENTION

The automotive industry is ever in search of improved friction materials for use in automobiles, trucks, and other motor vehicles. One particular area where improved friction materials have been sought is in the design and fabrication of clutch facings. Criteria of particular importance in clutch facing design are a burst strength adequate to meet ever higher rotational speeds of vehicle drive chains, an adequate coefficient of friction and reduction in wear to increase the useful life of clutches.

Major manufacturers of automotive clutch facings require that clutch facings meet a particular performance standard in the hot burst strength test. In this test, the driven member of the clutch, with two facings attached, is heated to 500° F. for 15 minutes and then be subjected to spin testing as a prerequisite to product acceptance. This test, is one of the most difficult tests to be passed by a clutch facing since at elevated temperatures fibrous materials and the binder comprising resin and/or rubber of which the clutch facing is formed lose strength, resulting in bursts at relatively low rotational speeds. Conventional clutch facings formed of asbestos fibers having an OD of 11 inches and an ID of $6\frac{1}{2}$ inches are known to withstand spin speeds of about 8,000 to 9,000 r.p.m. in the hot burst strength test.

As spin requirements for clutch facings have become more demanding, glass fibers have been used to strengthen the facings while asbestos has been retained as the friction material.

More recently, in an effort to improve hot burst strength, clutch facings have been formed from bundles of parallel continuous glass filaments spirally or randomly wound upon themselves in the form of an annular disc and impregnated with heat-curable cement. Such constructions are described in U.S. Pat. Nos. 3,743,069; 3,756,910 and 4,118,528.

According to U.S. Pat. No. 4,130,537, glass, as the active friction ingredient of a friction element, is too "aggressive" for most commercial applications, the aggressiveness being manifested during use by noise, vibration and/or erratic friction effects when the friction element is engaged with a mating surface. In order to overcome this shortcoming, the patent teaches the inclusion of infusible organic fibers having a decomposition temperature above 400° F. but below 800° F. Aramid fibers sold by duPont under the name Nomex are given as an example of such fibers.

Conventional clutch facings formed of asbestos fibers, although having adequate friction properties, e.g. a coefficient of friction of from about 0.22 to about 0.44, in addition to having limited hot burst strength, also exhibit a relatively high rate of wear on the order of about 0.01–0.012 inches for each 10,000 engagements.

Although glass fiber clutch facings exhibit improved hot burst strength and somewhat reduced wear, as compared to asbestos fiber clutch facings; nevertheless, there continues to be a need for improvements in both of these essential properties.

According to copending application Ser. No. 06/050,596, filed June 21, 1979, disc-shaped clutch facings can be fabricated using aramid fibers as both the reinforcing and friction material. However, in fabricating such clutch facings certain problems were encountered. More particularly, the clutch facings were difficult to grind to acceptable tolerances and were resistant to drilling to provide holes by means of which the facings may be attached to the power train of an internal combustion engine. During grinding the heat generated was sufficient to ignite the resulting dust in the exhaust system, and the ground facings had an unsightly fuzzy surface. By grinding the facings under water spray the hazzard of fire was reduced but the facings still had a fuzzy appearance. Similarly, the drilling of clean holes was most difficult whether the drilling operation was carried out under water spray or otherwise.

Like problems are encountered in attempts to fabricate disc brake pads and related friction members from aramid fibers, for such members must also have holes drilled therein for attaching the members, and be ground to accepted tolerances.

It is an object of this invention to provide novel friction members, such as clutch facings, disc brake pads and the like, containing aramid fibers, which friction members have improved wear properties.

Another object of this invention is to provide a novel method for producing friction members, such as clutch facings, comprising aramid fibers which method overcomes the above-discussed problems heretofore encountered in fabricating friction members from such fibers.

These and other objects of this invention will become apparent from the following detailed description of the invention and accompanying drawings in which.

DETAILED DESCRIPTION OF THE INVENTION

This invention provides novel friction facings of annular shape and brake pads comprising aramid fibers bonded together into a unitary structure by means of a heat-curable cement containing rubber, resin and friction modifiers.

Figure 1:
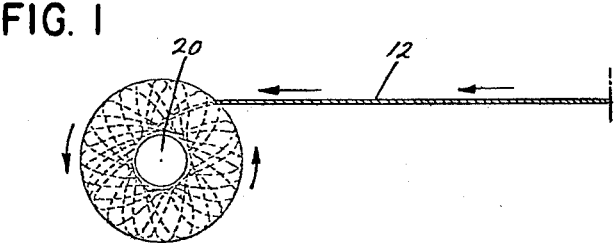
FIG. 1 represents a tape formed of aramid fibers impregnated with a heat-curable cement being wound upon itself in undulating fashion to produce a disc-shaped clutch facing preform.
Figure 2:
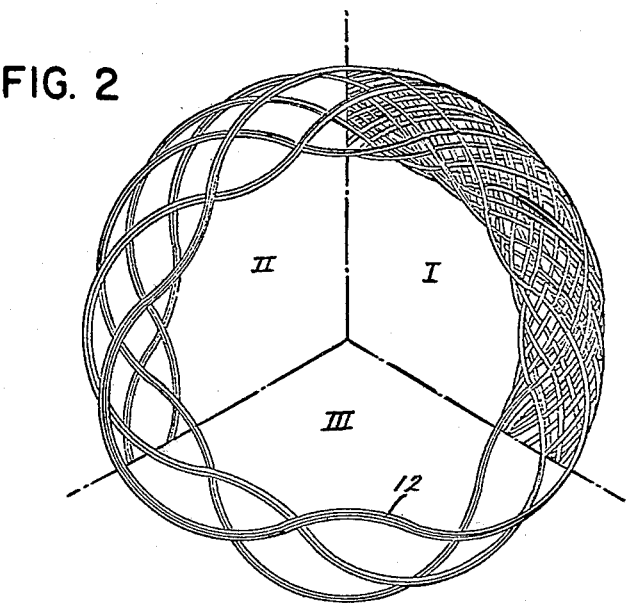
FIG. 2 shows a clutch facing preform of aramid fibers impregnated with a heat-curable cement in three stages of its formation.

Referring to the drawings, the reference numeral 10 indicates an annularly shaped disc-like friction facing such as a clutch facing. The friction facing 10 is formed by wrapping continuous bundle or tape 12 of generally continuous aramid filaments coated with a heat-curable cement as described hereinbelow in undulating fashion, as shown in FIGS. 1 and 2, to form a disc-like preform. FIG. 1 shows schematically the method by which continuous tape 12 is wound in undulating manner onto a revolving mandrel 20, whereby the tape constantly varies in the instantaneous radius at which it is being wound. Although the tape is preferably randomly wound as illustrated in the drawings, it may be spirally wound, if desired.

As particularly illustrated in FIG. 2, the clutch facing preform 20 is shown as having three segments I, II, and III, which segments illustrate the complete clutch facing preform I, and the intermediate (II) and (III) stages of formation of the preform.

The preform for the friction facing is subjected the heat and pressure to consolidate the preform and cure the cement. Following the molding step, the resulting facing may be subjected to further heat treatment to convert the cement into the infusible, insoluble state.

Other types of friction members, such as disc brake pads, may also be fabricated according to this invention.

In preparing disc brake pads according to this invention, short aramid fibers, e.g. chopped fibers, which, if desired, may be crimped, and aqueous-base heat-hardenable cement described in greater detail hereinafter, are blended uniformly, a blade-type mixer being generally suitable for such purpose. The mix is removed from the mixer and placed in a hot air circulating oven, at a temperature on the order of about 150° F., to reduce the amount of volatile constituents present to between about 4 and 6 percent. The dried mix, which may be in the form of pellets, may then be cold molded into disc brake pad preforms following which the preforms may be molded in a preheated mold, post cured, and drilled and ground to specified tolerances.

As an alternative procedure, disc brake preforms may be blanked out of an annular clutch facing preform prepared as described above in connection with the drawings. The disc brake preforms so obtained may be placed in a preheated mold and pressed, postcured and drilled and ground to the required tolerances.

The friction members of this invention exhibit improved wear characteristics thereby giving them a considerably longer useful life. In addition, the clutch facings possess adequate hot burst strength to meet today's rigid requirements.

Of particular advantage is the fact that the aramid friction members of this invention can be ground to size and drilled. The ground surface of the friction members does not have a fuzzy appearance and the drilled holes are clean and smooth. This result was totally unexpected and is believed to be attributable to the particular heat-curable cement system, hereinafter described, which is employed in combination with aramid fibers in the friction members.

The aramid fibers used in the friction element of the friction facing of the present invention are commercially available in yarn form under the trademark "Kevlar". Aramid is a generic name for fibers made by the acid group of the diacid chloride and the amine groups of the diamine being meta or para oriented relative to each other at low temperatures (below 212° F.). The aramid polymers of which the fibers are made are of high molecular weight and are characterized predominantly by the recurring structural unit:

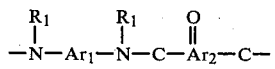

wherein $R_1$ is hydrogen or lower alkyl and wherein $Ar_1$ and $Ar_2$ may be the same or different and may be an unsubstituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization.

Aramid polymers of the type of which the fibers used in the friction facings of this invention are made are described in considerable detail in U.S. Pat. No. 3,094,511, and the disclosure of that patent is incorporated herein by reference. Such aramid fibers should have a decomposition temperature of at least about 850° F., preferably above 900° F.

Particularly preferred aramid fibers which may be used in the friction members of this invention are formed of polymers which are the condensation product of terephthalic acid and p-phenylenediamine. An example of fibers of this type are those having a decomposition temperature generally on the order of about 930° F., a density of 1.44 g./cm.$^3$, a fiber diameter of about 0.0005 inches, a tenacity of about 21 grams/denier, and a tensile strength of about 400,000 psi.

Depending upon the particular properties desired for the friction members and their intended use, the aramid fibers may be continuous or in the form of staple or chopped fibers, the latter being of relatively uniform length of from about ⅛" to 2" in length. For example, in clutch facings made according to the invention the use of aramid yarn composed of continuous filaments is preferred. On the other hand, yarn formed of staple fibers may be used in place of continuous fibers to effect cost reductions, staple being less expensive. In addition, staple or chopped fibers are especially useful in the manufacture of disc brake pads and similar friction members.

The aramid fibers may be replaced by up to about 30 percent, by weight, of non-aramid fibers, both organic and inorganic, examples of which are cotton, jute, hemp, nylon, rayon, glass and asbestos fibers. Metal wire, e.g. copper may also be present.

A "yarn" as used in this specification and claims refers to a collection or assembly of either substantially continuous aramid filaments or staple fibers. In the case of the former, a yarn may include from 100 up to 2000, preferably 1500 to 2000 individual substantially parallel filaments gathered together in any manner well known in the art. Yarns formed of staple fibers will generally be of from about 500 to about 10,000 denier, preferably from about 4000 to about 6000 denier. In either case the filaments of which the yarns are formed are extremely fine. Yarn comprised of substantially continuous filaments ordinarily will be free of twist, but may have a small amount of twist. Yarn formed of staple fibers will have sufficient twist to hold the fiber bundle together.

In addition to aramid fibers, the friction members, such as clutch facing 10 of this invention includes a heat-curable cement composition comprising heat-hardenable resin, vulcanizable elastomer, and friction modifiers.

The heat-curable cement with which the aramid fibers are coated or impregnated contains as essential constituents a vulcanizable rubber; preferably a carboxylated rubber as described more fully hereinbelow, a water-soluble one-step, thermosetting resin, and friction modifiers, in specified proportions. The cement is applied in the form of an aqueous dispersion which may also contain a surfactant.

By the term acrylic rubber or elastomer is meant polymers or copolymers generally based on either ethyl acrylate, butyl acrylate, or combinations thereof. These rubbers will generally contain comonomers such as 2-chloroethyl vinyl ether, 2-chloroethyl acrylate, acrylonitrile, vinyl chloracetate, methacrylic or itaconic acid, or methacrylonitrile, and preferably contain free carboxyl groups. Comonomers such as acrylonitrile, chloroethyl vinyl and chloroethyl acrylate improve oil resistance. The acrylic rubbers containing comonomers can be cured with a variety of cure systems such as ammonium benzoate and with soaps and sulfur.

The vulcanizable carboxylated rubbers are high strength, oil resistant rubbers composed of at least three monomers, namely, isoprene, chloroprene and one or more acrylic type acids or acrylonitrile or styrene, butadiene and one or more acrylic-type acids. The copolymerization of these monomers produces a chain similar to a normal neoprene, SBR or nitrile rubber except for the carboxyl groups which are distributed along the chain with a frequency of about 1 to every 100 to 200 carbon atoms.

These types of polymers are unique in that they can be cured or vulcanized by reactions involving the carboxylic group as well as normal sulfur-type vulcanization. One method of curing is to cross-link the chains by neutralizing the carboxylic groups with the oxide or salt of polyvalent metal. The $Ca^{++}$, $Mg^{++}$, and $Pb^{++}$ ions are capable of effecting such a vulcanization reaction. Since the polymer chains also contain double bonds such as occur in SBR and butadiene-acrylonitrile rubbers, the normal types of sulfur vulcanization can also be employed. The metal oxide and sulfur-curing systems are applicable to both the dry rubber and latex form of the carboxylated rubbers.

As compared with a conventional SBR or nitrile rubbers of equivalent oil resistance, the carboxy modification exhibits much higher tensile strength and modulus, lower elongation, higher hardness, much improved hot tear and tensile, better low-temperature brittleness, improved ozone resistance, and better retention of physical properties after hot-oil and air aging. The preferred rubber is a carboxylated nitrile rubber.

The carboxy rubbers are available in the form of latexes which are stable over a pH range of 3.5 to 9.5. As noted above the latex can be cured by means of conventional curing systems such as sulfur, metal oxide and accelerator, or by use of metal oxide alone. In the latter case, 5 to 10 parts per 100 of polymer solids are generally needed.

In addition to acrylic or carboxylated rubber, the heat-curable cement system contains a water-soluble, one-step, thermosetting phenolic resin. By the term "water soluble" is meant that the resin is soluble in water up to about 10 percent, by weight. This resin, prior to curing, comprises a mixture of phenols reacted with one or more molecules of aldehyde, such as formaldehyde to form compounds such as

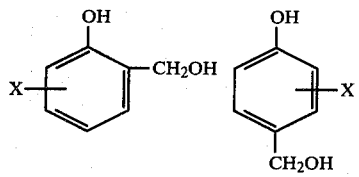

where x is lower alkyl or hydroxy alkyl, or acryl. Other suitable one-step thermosetting resins include resorcinol formaldehyde, phenol-cresol formaldehyde and melamine formaldehyde resins. Such resins, cure in one to two minutes on a hot plate at temperatures on the order of about 265°–285° F.

Advantageously, the heat-curable cement system is applied to the aramid fibers in the form of an aqueous dispersion, thereby obviating the potential fire and ecological problems presented by the use of organic solvents and making possible reduction in processing costs. In addition, it appears that the improved grinding and drilling properties of friction members obtainable according to this invention are attributable, at least in part, to the use of such aqueous systems.

The heat-curable cement system is applied to the aramid fibers as a high solids e.g. a 30 to 85 percent solids, aqueous dispersion, and generally will comprise from about 5 to about 40 percent rubber, about 5 to 40 percent phenolic resin, and about 20 to about 80 percent friction modifiers, based on the total weight of cement solids. The aqueous dispersion may contain a small but effective amount of a surfactant or dispersant to enhance wetting of the filaments by the solids. About 0.01 to 5 percent is generally satisfactory. Since the latexes are prepared in the presence of a surfactant, it may not be necessary to add additional surfactant when preparing the cement.

The heat-curable cement system should also contain curing agents for the rubber and resin, and may also contain accelerators to reduce curing time.

Particulate friction modifiers for use in the cement system are well known and include carbon black, graphite, metal oxides, metallic powders, barytes, clay, silica, alumina, cryolite, litharge and the like. In addition the heat-curable cement system may contain well known organic fillers such as finely divided polymerized cashew nut oil.

The aramide fibers, preferably in the form of yarns, from the coating step generally will be coated with about 40 to 95 percent, preferably 60 to about 80 percent, by weight of coated fibers, of cement solids.

There are various devices in the textile field which are designed to splay or separate yarn bundles to enhance pick-up of various coating materials. For example the strands or yarn may be passed through a comb-like device before they enter the coater, which generally is of the roller type, whereby the fiber bundles are opened up for intimate contact with the coating composition.

Typical cement compositions particularly suitable for bonding the aramid fibers of the friction members according to this invention, are as given in Table I, below:

TABLE I

| Constituent | Parts By Weight (Dry Basis) |
| --- | --- |
| Vulcanizable rubber | 5–20 |
| Phenolic resin | 5–20 |
| Accelerator | 0–2 |
| Curing Agent | 1–5 |
| Particulate Friction Modifiers | 30–60 |

Following application of the heat-curable cement to the fibers and removal of water, in preparation of a clutch facing the yarns are combined to form a tape by gathering together a plurality of yarns generally 2 to 15, and preferably 5 to 10, by rotating rollers or the like which twist the yarns together. In the resulting tape there may be a small amount of twist.

As noted above, a tape formed of aramid filaments and coated with heat-hardenable cement is wound in spiral or undulating fashion, preferably the latter, onto a revolving mandrel in such manner that the convolutions of the tape vary in the instantaneous radius at which they are being wound. This arrangement is best illustrated in FIG. 2 of the drawings.

In forming clutch facings according to the invention, a clutch facing preform prepared as above is placed in a mold and heated at elevated temperatures in the range of about 350° to 375° F., under a pressure of about 3500 to 5000 psi for a short period of time, e.g. 2–3 minutes to consolidate and densify the preform and at least partially cure the binder. Subsequently, the resulting facings are placed in an oven heated to a temperature of about 400° to 450° F. where they remain for several hours. During this latter heat treatment the cement is converted into the infusible, insoluble state.

Figure 3:
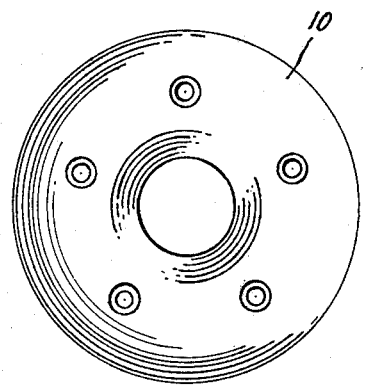
FIG. 3 is an elevation or face view of a clutch facing according to this invention.
Figure 4:
FIG. 4 is a side or edge view of the clutch facing shown in FIG. 3.

The clutch facings are then subjected to conventional mechanical processing such as grinding to achieve acceptable tolerances, and drilled to provide holes by means of which the facings are attached to the power train of an internal combustion engine (see particularly FIGS. 3 and 4).

The invention is further described by the following examples.

EXAMPLE I

This example describes the preparation of a clutch facing of aramid fibers according to this invention.

A yarn was obtained by combining a 2/1 spun aramid yarn (47.8% by wt.) with 10 mil. copper wire (28.8%) and 5/1 cotton yarn (23.3%), and the resulting yarn was coated with an aqueous base heat-curable cement of the composition set forth in Table II, below containing 46 percent solids:

TABLE II

| Constituent | Weight Percent (Dry Solids) |
|---|---|
| Carboxylated nitrile rubber | 16.5 |
| Heat curable, phenol formaldehyde resin | 13.9 |
| Particulate friction modifiers | 55.5 |
| Cure accelerator | 0 |
| Curinng agent | 14.1 |

The cement was continuously applied to the yarn by passing the yarn through a dip tank and the coated yarn was dried in a drying oven maintained at 115° F. Using this procedure, a 52.5 weight percent pickup of dried cement, based on the total weight of coated yarn, was obtained.

A tape was formed by gathering the coated yarns together as they exited from the drying oven, and the tape was wound on a rotating roll.

Sufficient of the coated aramid fiber tape required to form a preform for a clutch facing was wound in undulating fashion onto a revolving madril in such manner that the convolutions of the tape varied in the instantaneous radius at which they were wound.

Each preform thus prepared was placed in a heated grooved clutch facing flash mold where the preform was molded for 3 minutes at a temperature of 350° F. and a pressure of 4000 psi to densify and unite the preform and effect partial cure of the cement. The resulting friction facing was subsequently postcured at programmed temperatures ranging from 300° to 450° F. for a total of 5½ hours.

No significant warpage, shrinkage, or other distortion from the molded clutch facing was observed after curing. Each clutch facing was ground to the following dimensions: O.D. 11"; I.D. 6½"; thickness 0.137"±0.002," and holes were drilled into the facings for mounting them in a clutch assembly. No difficulties, such as fuzzy surface, fires or smoldering dust were encountered in the grinding and drilling operations, and the drilled holes were clean.

EXAMPLE II

A clutch facing prepared as described in Example I was tested according to the Controlled Torque test described below using a Long Clutch Dynamometer. In this test, after carefully measuring the thickness of the facings at ten different places on the O.D. and I.D., the friction properties of the facing are measured as follows:

A. For each application the clutch is applied for 4 seconds at 1100 rpm, and a constant torque of 235 lb. ft., the clutch output torque is controlled by limiting the engagement of the clutch through means of the adjustment in the releasing mechanism. Adjustment can be made to achieve only an average value of output torque during the 4 second engagement.

B. The clutch is released for 56 seconds followed by reapplication.

C. After 100 applications, a 15 second hot fade test at full pressure is made.

D. Without cooling, the pressure is adjusted immediately to controlled torque of 235 lb. ft., and an additional 100 applications are made.

E. Another 15 second hot fade test at full pressure is made before proceeding, without cooling with an additional 100 applications.

F. A final 15 sec. hot fade at full pressure is made before concluding the test.

Table III sets forth the coefficient of friction data as the maximum and minimum values obtained during the first, second and third 15 sec. fades.

TABLE III

| Fade No. | Max. $\mu$ | Min. $\mu$ |
|---|---|---|
| 1 | .47 | .26 |
| 2 | .47 | .27 |
| 3 | .46 | .28 |

An unexpected and superior average wear of 0.009" during the total duration of the test was observed.

It is claimed:

1. A disc-shaped clutch facing having an inner diameter and an outer diameter, said facing comprising a tape impregnated with an aqueous base heat-hardenable cement and disposed in spiral or undulating fashion and having been subjected to heat and pressure to compress said tape to form a disc-shaped facing and to cure said cement, said tape comprising a plurality of strands of aramid fibers having a decomposition temperature of at least about 850° F. coated with a heat-hardenable cement comprising a water-soluble, one-step thermosetting phenolic resin, a heat-curable elastomer selected from the group consisting of carboxylated neoprene rubber, carboxy nitrile rubber and carboxy butadiene styrene rubber, and particulate friction modifier, said friction facing comprising from about 40 to about 95 percent of heat-hardenable cement, said percentages being by weight based on the total weight of fibers and cement solids in said facings.

2. A clutch facing according to claim 1 in which said strands are formed of substantially continuous aramid fibers and said tape is disposed in undulating fashion.

3. A clutch facing according to claim 1 comprising from about 60 percent to about 80 percent heat hardenable cement.

4. A clutch facing according to claim 1 in which said cement comprises from about 5 to 40 percent, by weight, of thermosetting resin, from about 5 to about 40 percent of heat-curable elastomer, and from about 20 to 80 percent friction modifier.

5. A clutch facing according to claim 4 in which said heat-hardenable cement comprises about 5 to 20 percent resin, about 5 to 20 percent rubber, and about 30 to 60 percent friction modifier.

6. A clutch facing according to claim 1 in which said aramid fibers have a decomposition temperature of at least about 900° F.

7. A clutch facing according to claim 1 in which said heat-hardenable cement comprises phenol formaldehyde resin and carboxy nitrile rubber.

8. A clutch facing according to claim 1 in which said aramid fibers are formed of the condensation product of terephthalic acid and p-phenylenediamine.

9. A clutch facing according to claim 8 in which said aramid fibers have a decomposition temperature of about 930° F.

10. A friction member of improved resistance to wear comprising from about 5 to about 60 percent of aramid fibers having a decomposition temperature of at least about 850° F. bonded together with from about 40 to about 95 percent of heat-hardenable cement comprising a water-soluble, one-step thermosetting phenolic resin, and a heat-curable elastomer selected from the group consisting of carboxylated neoprene rubber, carboxy nitrile rubber and carboxy butadiene styrene rubber, and particulate friction modifier, said percentages being by weight based on the combined weight of fibers and cement, said cement having been applied to said fibers in the form of an aqueous suspension and said member having been subjected to heat and pressure to consolidate said fibers and to cure said cement.

11. A friction member according to claim 10 in which said aramid fibers are formed of the condensation product of terephthalic acid and p-phenylenediamine.

12. A friction member according to claim 10 in which said heat-hardenable cement comprises from about 5 to about 40 percent, by weight of phenol formaldehyde resin, from about 5 to about 40 percent of carboxy nitrile rubber, and about 20 to 80 percent particulate friction modifier.

13. A friction member according to claim 12 in which said heat-hardenable cement comprises about 5 to about 20 percent resin, about 5 to 20 percent rubber, and about 30 to 60 percent friction modifier.

14. A friction member according to claim 10 in which said aramid fibers have a decomposition temperature of at least about 900° F.

15. A friction member according to claim 11 in which said aramid fibers have a decomposition temperature of about 930° F.

16. A friction member according to claim 10 in the form of a disc brake pad.

17. A friction member according to claim 10 in the form of a clutch facing.

18. A composition for use in forming a friction member of improved resistance to wear comprising a mixture of from about 5 to about 60 percent of aramid fibers having a decomposition temperature of at least about 850° F. coated with from about 40 to about 95 percent of an aqueous base heat-hardenable cement comprising a water soluble, one-step thermosetting phenolic resin, and a heat-curable elastomer selected from the group consisting of carboxylated neoprene rubber, carboxy nitrile rubber and carboxy butadiene styrene rubber, and particulate friction modifiers, said percentages being by weight based on the combined weight of fibers and cement solids.

19. A composition according to claim 18 in which said mixture comprises from about 60 to about 80 percent heat-hardenable cement.

20. A composition according to claim 18 in which said aramid fibers are formed of the condensation product of terephthalic acid and p-phenylenediamine.

21. A composition according to claim 18 in which said heat-hardenable cement comprises from about 5 to 40 percent by weight of phenol formaldehyde resin, from about 5 to about 40 percent of carboxy nitrile rubber and about 20 to 80 percent particulate friction modifier.

22. A composition according to claim 21 in which said heat-hardenable cement comprises about 5 to 20 percent of resin, about 5 to 20 percent rubber, and about 30 to 60 percent friction modifier.

23. A composition according to claim 18 in which said aramid fibers have a decomposition temperature of at least about 900° F.

24. A composition according to claim 20 in which said aramid fibers have a decomposition temperature of about 930° F.

25. The method of forming an annular facing for a clutch or the like comprising the steps of:
(A) impregnating a plurality of yarns comprising aramid filaments having a decomposition temperature above about 850° F. with a heat-curable system comprising from about 5 to about 40 percent of a vulcanizable rubber selected from the group consisting of carboxylated neoprene rubber, carboxy nitrile rubber and carboxy butadiene styrene rubber, from about 5 to about 40 percent of a water-soluble, low molecular weight one-step, thermosetting phenolic resin, and from about 20 to about 80 percent of particulate friction modifier, said percentages being by weight, based on the combined weight of said components of said cement system, by passing said yarns through a high solids aqueous dispersion of said cement system containing from about 0.01 to about 5 percent, based on weight of cement system solids, of a surfactant or dispersant,
(B) drying said yarns impregnated with said heat-curable cement system,
(C) winding said yarns in spiral or undulating fashion to form a disc-shaped clutch facing preform, and
(D) subjecting said preform to heat and pressure to densify said preform and cure said cement.

26. The method of claim 25 in which said yarns from step (A) contain a total of from about 65 to about 90 percent by weight of heat-curable cement system, based on weight of coated filaments.

27. The method of claim 25 in which said yarns are wound in undulating fashion.

28. The method of claim 25 in which a tape is obtained by combining from about 2 to about 15 ends of said impregnated aramid yarn, each of said yarn ends comprising from about 100 to 2000 substantially continuous aramid filaments, and said tape is wound in undulating fashion to form a clutch facing preform.

29. The method of claim 28 in which at least one helix of continuous filamentary material is wrapped around said impregnated tape prior to winding said tape to form a clutch facing preform.

30. The method of claim 29 in which said filamentary material comprises metal wire.

31. The method according to claim 25 in which said aramid fibers are staple fibers.

32. The method according to claim 28 in which said tape of which said preform is composed contains up to about 30 percent, by weight, of non-aramid fibers.

33. The method according to claim 25 in which said aramid fibers are formed of the condensation product of terephthalic acid and p-phenylenediamine and have a decomposition temperature of about 930° F.

34. The method according to claim 25 in which said yarns, prior to impregnation with heat-hardenable cement are in the form of a woven or knitted fabric and said fabric, after impregnation with said cement, is wound in undulating fashion to form a clutch facing preform.

* * * * *